United States Patent
Ma et al.

(10) Patent No.: US 11,493,981 B1
(45) Date of Patent: Nov. 8, 2022

(54) RAPID FREQUENCY SEARCHING METHOD AND APPARATUS FOR DATA PROCESSING DEVICE, AND DATA PROCESSING DEVICE

(71) Applicant: SHENZHEN MICROBT ELECTRONICS TECHNOLOGY CO., LTD., Shenzhen (CN)

(72) Inventors: Weibin Ma, Shenzhen (CN); Hong Zhang, Shenzhen (CN); Lihong Huang, Shenzhen (CN); Zuoxing Yang, Shenzhen (CN); Haifeng Guo, Shenzhen (CN)

(73) Assignee: Shenzhen MicroBT Electronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/606,939

(22) PCT Filed: Jul. 23, 2021

(86) PCT No.: PCT/CN2021/108054
§ 371 (c)(1),
(2) Date: Apr. 15, 2022

(87) PCT Pub. No.: WO2022/022403
PCT Pub. Date: Feb. 3, 2022

(30) Foreign Application Priority Data

Jul. 30, 2020 (CN) .......................... 202010748968.8

(51) Int. Cl.
*G06F 1/324* (2019.01)
(52) U.S. Cl.
CPC .................................... *G06F 1/324* (2013.01)
(58) Field of Classification Search
CPC ....... G06F 1/324; G06F 1/3206; G06F 1/3296
See application file for complete search history.

(56) References Cited

U.S. PATENT DOCUMENTS

2004/0128566 A1\* 7/2004 Burr ...................... G06F 1/3203
713/300
2007/0255972 A1\* 11/2007 Gaskins .................. G06F 1/324
713/500
(Continued)

FOREIGN PATENT DOCUMENTS

| CN | 1501463 A | 6/2004 |
|---|---|---|
| CN | 102681450 A | 9/2012 |

(Continued)

OTHER PUBLICATIONS

Office Action in corresponding Chinese Patent Application No. 202010748968.8, dated Jan. 19, 2021.
(Continued)

*Primary Examiner* — Phil K Nguyen
*Assistant Examiner* — Brian J Corcoran
(74) *Attorney, Agent, or Firm* — Marshall, Gerstein & Borun LLP

(57) ABSTRACT

The present disclosure discloses a rapid frequency searching method and apparatus for a data processing device, and a data processing device. The method includes: gradually raising a frequency of a computing chip from an initial frequency point to a target frequency through at least one first frequency point at an initial output voltage of a power source of the data processing device, wherein the duration when the computing chip is located at each of the at least one first frequency point is shorter than the duration when the computing chip is located at each of the at least one first frequency point in a routine frequency searching process; and after the computing chip achieves the target frequency, adjusting the output voltage of the power source of the data processing device and the frequency of the computing chip according to at least one output voltage value and at least one second frequency point in combination with test tasks delivered to the computing chip and feedback results from (Continued)

---

Gradually raise the frequency of the computing chip in the data processing device from the initial frequency point to the target frequency at the initial output voltage of the power source of the data processing device, and record at least one first frequency point gone through in the process that the frequency is gradually raised, in which when the computing chip is located at each of the at least one first frequency point, the computing chip enters a next first frequency point after a temperature of the data processing device is stabilized, until the data processing device reaches a stable working temperature when the computing chip in the data processing device achieves the target frequency

↓

After the computing chip in the data processing device achieves the target frequency, adjust the output voltage of the power source of the data processing device and the frequency of the computing chip under a condition of keeping the stable working temperature of the data processing device substantially constant, in combination with test tasks delivered to the computing chip and feedback results from the computing chip, to obtain a limit frequency of the computing chip and an output voltage, corresponding to the limit frequency, of the power source of the data processing device at the stable working temperature, in which each of the at least one output voltage value and each of the at least one second frequency point adopted during adjustment are recorded in the process of adjusting the output voltage of the power source of the data processing device and the frequency of the computing chip the computing chip to obtain a limit frequency of the computing chip and an output voltage, corresponding to the limit frequency, of the power source of the data processing device.

18 Claims, 2 Drawing Sheets

(56) References Cited

U.S. PATENT DOCUMENTS

| | | | |
|---|---|---|---|
| 2010/0094572 | A1 | 4/2010 | Chase et al. |
| 2010/0188115 | A1* | 7/2010 | von Kaenel ........ G06F 1/3203 326/16 |
| 2013/0293269 | A1 | 11/2013 | Li et al. |
| 2014/0191734 | A1* | 7/2014 | Kuang ................ G05F 1/12 323/234 |
| 2018/0011520 | A1* | 1/2018 | Saeidi ................ G06F 1/206 |

FOREIGN PATENT DOCUMENTS

| | | |
|---|---|---|
| CN | 104597393 A | 5/2015 |
| CN | 108459934 A | 8/2018 |
| CN | 108984469 A | 12/2018 |
| CN | 109002356 A | 12/2018 |
| CN | 109032681 A | 12/2018 |
| CN | 109240880 A | 1/2019 |
| CN | 110687990 A | 1/2020 |
| CN | 111966409 A | 11/2020 |
| CN | 111966409 B | 4/2021 |

OTHER PUBLICATIONS

Notification to Grant Patent Right for Invention in corresponding Chinese Patent Application No. 202010748968.8, dated Feb. 25, 2021.
International Search Report for Application No. PCT/CN2021/108054, dated Oct. 21, 2021.

* cited by examiner

Gradually raise a frequency of a computing chip in the data processing device from an initial frequency point to a target frequency through at least one first frequency point recorded in advance, at an initial output voltage of a power source of the data processing device, wherein a duration when the computing chip is located at each of the at least one first frequency point is shorter than a duration when the computing chip is located at each of the at least one first frequency point in a routine frequency searching process

↓

After the computing chip in the data processing device achieves the target frequency, adjust an output voltage of the power source of the data processing device and the frequency of the computing chip, according to at least one output voltage value and at least one second frequency point recorded in advance, in combination with test tasks delivered to the computing chip and feedback results from the computing chip, to obtain a limit frequency of the computing chip and an output voltage, corresponding to the limit frequency, of the power source of the data processing device

FIG. 1

Gradually raise the frequency of the computing chip in the data processing device from the initial frequency point to the target frequency at the initial output voltage of the power source of the data processing device, and record at least one first frequency point gone through in the process that the frequency is gradually raised, in which when the computing chip is located at each of the at least one first frequency point, the computing chip enters a next first frequency point after a temperature of the data processing device is stabilized, until the data processing device reaches a stable working temperature when the computing chip in the data processing device achieves the target frequency

↓

After the computing chip in the data processing device achieves the target frequency, adjust the output voltage of the power source of the data processing device and the frequency of the computing chip under a condition of keeping the stable working temperature of the data processing device substantially constant, in combination with test tasks delivered to the computing chip and feedback results from the computing chip, to obtain a limit frequency of the computing chip and an output voltage, corresponding to the limit frequency, of the power source of the data processing device at the stable working temperature, in which each of the at least one output voltage value and each of the at least one second frequency point adopted during adjustment are recorded in the process of adjusting the output voltage of the power source of the data processing device and the frequency of the computing chip

FIG. 2

RAPID FREQUENCY SEARCHING METHOD AND APPARATUS FOR DATA PROCESSING DEVICE, AND DATA PROCESSING DEVICE

CROSS REFERENCE TO RELATED APPLICATIONS

The present disclosure claims priority to Chinese Patent Application No. 202010748968.8, filed on Jul. 30, 2020, entitled "Rapid Frequency Searching Method and Apparatus for Mining Machine, and Mining Machine", the entire contents of which are incorporated herein by reference.

TECHNICAL FIELD

The present disclosure relates to the technical field of virtual currency mining machines, and in particular to, a rapid frequency searching method and apparatus for a data processing device, and a data processing device adopting the apparatus.

BACKGROUND

In an existing virtual currency mining machine, a manner of working at a fixed frequency and a fixed voltage is adopted, that is, a computing chip in the mining machine adopts a fixed working frequency set in advance, and an output voltage of a power source of the mining machine adopts a fixed voltage set in advance. By adopting such a manner, in order to guarantee the normal work of the mining machine, the output voltage of the power source may be redundant to a certain extent, and the fixed working frequency of each computing chip is not its limit working frequency.

SUMMARY

Embodiments of the present disclosure provide a rapid frequency searching method and apparatus for a data processing device, and a data processing device, to reduce the frequency searching time for the data processing device, so as to enable the data processing device to enter into a working state as soon as possible, and improve the working efficiency of the data processing device.

Technical solutions according to embodiments of the present disclosure are implemented as follows:

A rapid frequency searching method for a data processing device, includes the following steps performed after the data processing device is started:

gradually raising a frequency of a computing chip in the data processing device from an initial frequency point to a target frequency through at least one first frequency point recorded in advance, at an initial output voltage of a power source of the data processing device, in which a duration when the computing chip is located at each of the at least one first frequency point is shorter than a duration when the computing chip is located at each of the at least one first frequency point in a routine frequency searching process; and after the computing chip in the data processing device achieves the target frequency, adjusting an output voltage of the power source of the data processing device and the frequency of the computing chip, according to at least one output voltage value and at least one second frequency point recorded in advance, in combination with test tasks delivered to the computing chip and feedback results from the computing chip, to obtain a limit frequency of the computing chip and an output voltage, corresponding to the limit frequency, of the power source of the data processing device.

Further, the at least one first frequency point recorded in advance is at least one first frequency point gone through in the routine frequency searching process performed in advance by the data processing device;

the at least one output voltage value recorded in advance is at least one output voltage value adopted in the routine frequency searching process performed in advance by the data processing device; and the at least one second frequency point recorded in advance is at least one second frequency point adopted in the routine frequency searching process performed in advance by the data processing device.

Further, the routine frequency searching process includes the following steps performed after the data processing device is started:

gradually raising the frequency of the computing chip in the data processing device from the initial frequency point to the target frequency at the initial output voltage of the power source of the data processing device, and recording at least one first frequency point gone through in the process that the frequency is gradually raised, in which when the computing chip is located at each of the at least one first frequency point, the computing chip enters a next first frequency point after a temperature of the data processing device is stabilized, until the data processing device reaches a stable working temperature when the computing chip in the data processing device achieves the target frequency; and after the computing chip in the data processing device achieves the target frequency, adjusting the output voltage of the power source of the data processing device and the frequency of the computing chip under a condition of keeping the stable working temperature of the data processing device substantially constant, in combination with test tasks delivered to the computing chip and feedback results from the computing chip, to obtain a limit frequency of the computing chip and an output voltage, corresponding to the limit frequency, of the power source of the data processing device at the stable working temperature, in which each of the at least one output voltage value and each of the at least one second frequency point adopted during adjustment are recorded in the process of adjusting the output voltage of the power source of the data processing device and the frequency of the computing chip.

Further, in the rapid frequency searching method for the data processing device, the number of the test tasks delivered to the computing chip is smaller than the number of the test tasks delivered to the computing chip in the routine frequency searching process.

Further, the step of adjusting the output voltage of the power source of the data processing device and the frequency of the computing chip, according to the at least one output voltage value and the at least one second frequency point recorded in advance, in combination with the test tasks delivered to the computing chip and the feedback results from the computing chip, to obtain the limit frequency of the computing chip and the output voltage, corresponding to the limit frequency, of the power source of the data processing device includes:

delivering a plurality of test tasks to the computing chip at any one output voltage value and any one second frequency point;

receiving feedback results from the computing chip, and determining whether the computing chip is capable of normally working at the one second frequency point according to a plurality of feedback results corresponding to the plurality of test tasks; and traversing all output voltage values and all second frequency points under each of the at least one output voltage value to determine a highest second frequency point at which the computing chip is capable of normally working and an output voltage value corresponding to the highest second frequency point, determining the highest second frequency point as the limit frequency of the computing chip, and determining the output voltage value corresponding to the highest second frequency point as the output voltage, corresponding to the limit frequency, of the power source of the data processing device.

Further, the step of adjusting the output voltage of the power source of the data processing device and the frequency of the computing chip under the condition of keeping the stable working temperature of the data processing device substantially constant, in combination with the test tasks delivered to the computing chip and the feedback results from the computing chip, to obtain the limit frequency of the computing chip and the output voltage, corresponding to the limit frequency, of the power source of the data processing device at the stable working temperature includes:

keeping the stable working temperature of the data processing device substantially constant;

delivering a plurality of test tasks to the computing chip at any one output voltage value and any one second frequency point;

receiving feedback results from the computing chip, and determining whether the computing chip is capable of normally working at the one second frequency point under the condition of the stable working temperature according to a plurality of feedback results corresponding to the plurality of test tasks; and traversing all output voltage values and all second frequency points under each of the at least one output voltage value to determine a highest second frequency point, at which the computing chip is capable of normally working under the stable working temperature, and an output voltage value corresponding to the highest second frequency point, determining the highest second frequency point as the limit frequency of the computing chip under the condition of the stable working temperature, and determining the output voltage value corresponding to the highest second frequency point as the output voltage, corresponding to the limit frequency, of the power source of the data processing device under the condition of the stable working temperature.

A rapid frequency searching apparatus for a data processing device includes:

a storage module, in which the storage module is configured to store at least one first frequency point recorded in advance, at least one output voltage value recorded in advance, and at least one second frequency point recorded in advance; and an execution module, in which the execution module is configured to:

gradually raise a frequency of a computing chip in the data processing device from an initial frequency point to a target frequency through the at least one first frequency point stored in the storage module, at an initial output voltage of a power source of the data processing device, in which a duration when the computing chip is located at each of the at least one first frequency point is shorter than a duration when the computing chip is located at each of the at least one first frequency point in a routine frequency searching process; and after the computing chip in the data processing device achieves the target frequency, adjust an output voltage of the power source of the data processing device and the frequency of the computing chip according to the at least one output voltage value and the at least one second frequency point stored in the storage module, in combination with test tasks delivered to the computing chip and feedback results from the computing chip, to obtain a limit frequency of the computing chip and an output voltage, corresponding to the limit frequency, of the power source of the data processing device.

A data processing device is configured to process data of virtual currencies, and the data processing device adopts the above-mentioned rapid frequency searching apparatus for the data processing device.

A non-transitory computer readable storage medium, storing instructions which, when being executed by a processor, enable the processor to perform the steps in the above-mentioned rapid frequency searching method for the data processing device.

An electronic device includes:

at least one processor; and a memory in communication connection with the at least one processor; in which the memory stores instructions executable for the at least one processor, and the instructions are executed by the at least one processor to enable the at least one processor to perform the steps in the rapid frequency searching method for the data processing device.

It can be seen from the above solutions that in the rapid frequency searching method for the data processing device according to the embodiments of the present disclosure, by shortening the duration when the computing chip is at each of the first frequency points, the frequency searching time can be remarkably shortened, and the frequency raising effect of the computing chip would not be affected. For a data processing device which is located in a non-extreme environment and has been subjected to a routine frequency searching process at an earlier stage, when it is started again, an effect the same as that of the frequency raising procedure in the routine frequency searching process can be achieved by shortening its staying time at each first frequency point, and the time cost by the frequency raising procedure can be greatly saved. In the rapid frequency searching method for the data processing device according to the embodiments of the present disclosure, the time cost by the computing chip to perform the test tasks can be shortened by reducing the number of test tasks, and when the data processing device is started again, it is unnecessary to perform excessive test tasks again, an effect the same as or similar to that at a frequency and voltage optimization stage in the routine frequency searching process can be achieved by performing a relatively small number of test tasks, and the time cost at the frequency and voltage optimization stage can be greatly saved. Compared with the routine frequency searching process, the rapid frequency searching method for the data processing device according to the embodiments of the present disclosure lies in that the frequency searching time is greatly shortened, and the power consumption caused during frequency search is reduced; moreover, the saved time is used for data processing and calculating of the data processing device, so that the data processing efficiency is further improved. Compared with the routine frequency search, the rapid frequency searching method for the data processing device according to the embodiments of the present disclosure is more suitable for scenarios where frequent and repeated starting is required, while ensuring that functions and performances of the data processing device are basically maintained. In addition, when the rapid frequency searching method for the data processing device according to the embodiments of the present disclosure is combined with the routine frequency searching process, it enables the data processing device to achieve a stable and reliable effect by virtue of the routine frequency searching process when an extreme environment change occurs, and achieves a purpose of rapid starting in a non-extreme environment. The rapid frequency searching method for the data processing device according to the embodiments of the present disclosure and the routine frequency search supplement each other, so that frequency searching requirements of the data processing device under various environmental conditions are met.

BRIEF DESCRIPTION OF THE DRAWINGS

FIG. 1 is a flow chart showing a rapid frequency searching method for a data processing device in an embodiment of the present disclosure;

FIG. 2 is a flow chart showing a routine frequency searching process in an embodiment of the present disclosure;

DETAILED EMBODIMENTS

Figure 3:
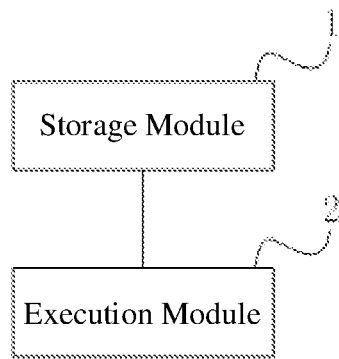
FIG. 3 is a schematic diagram showing a rapid frequency searching apparatus for a data processing device in an embodiment of the present disclosure.

In order to make objectives, technical solutions and advantages of the present disclosure clearer and more understandable, the present disclosure will be further described in detail below with reference to the accompanying drawings and embodiments.

As previously mentioned, a manner of working at a fixed frequency and a fixed voltage is adopted in an existing virtual currency mining machine. Although such setting can guarantee the normal work of the mining machine, a redundant voltage may cause power waste of the mining machine and increase useless power consumption of a virtual currency mine, and the fixed working frequency also limits the exertion of performances of a computing chip and reduces the mining efficiency. Therefore, due to the adoption of the manner of working at the fixed frequency and the fixed voltage, on the one hand, the useless power consumption of the virtual currency mine is increased, and on the other hand, the mining efficiency is reduced, and thus, the operation costs of the mining machine and the mine are greatly increased as a whole.

By relieving restrictions on frequencies and voltages and determining a limit frequency generated when the computing chip in the mining machine works and an output voltage of a power source of the mining machine in a frequency searching manner during starting, the mining efficiency can be improved, the useless power consumption can also be avoided, then, the power consumption is greatly reduced, and the operation costs of the mining machine and the mine are reduced. However, the work of the mining machine is also affected by temperatures. Both excessively high and low temperatures are not beneficial to the exertion of the computing power of the mining machine. It is also required to be considered that the temperature of the mining machine gradually rises as the frequency of the computing chip increases in a frequency searching process. Therefore, there is a process of waiting the temperature of the mining machine to synchronously rise in the frequency searching process, which costs a great deal of time and results in an overlong frequency searching process. The frequency searching process always takes about 30 minutes after the mining machine is started, and the mining machine is incapable of providing normal computing power in the frequency searching process. If the situation that the mining machine is frequently started occurs, the normal mining time of the mining machine is greatly shortened, and thus, the efficiency of the mining machine and the mine is reduced as a whole.

Therefore, how to shorten the frequency searching time of a mining machine so as to enable the mining machine to enter a working state as early as possible and increase the working efficiency of the mining machine becomes an issue yet to be addressed.

As shown in FIG. 1, a rapid frequency searching method for a data processing device according to an embodiment of the present disclosure includes the following steps performed after the data processing device (such as a virtual currency mining machine or a mining machine) is started:

gradually raising a frequency of a computing chip in the data processing device from an initial frequency point to a target frequency through at least one first frequency point recorded in advance, at an initial output voltage of a power source of the data processing device, in which a duration when the computing chip is located at each of the at least one first frequency point is shorter than a duration when the computing chip is located at each of the at least one first frequency point in a routine frequency searching process; and after the computing chip in the data processing device achieves the target frequency, adjusting an output voltage of the power source of the data processing device and the frequency of the computing chip, according to at least one output voltage value and at least one second frequency point recorded in advance, in combination with test tasks delivered to the computing chip and feedback results from the computing chip, to obtain a limit frequency of the computing chip and an output voltage, corresponding to the limit frequency, of the power source of the data processing device.

Through the above, the process of the rapid frequency searching method is completed. Then, the limit frequency is used as a working frequency in a process of data processing (such as virtual currency mining) of the computing chip, and the output voltage, corresponding to the limit frequency, of the power source of the data processing device is used as an output voltage of the power source of the data processing device in a working process.

The at least one first frequency point recorded in advance is at least one first frequency point gone through in the routine frequency searching process performed in advance by the data processing device;

the at least one output voltage value recorded in advance is at least one output voltage value adopted in the routine frequency searching process performed in advance by the data processing device; and the at least one second frequency point recorded in advance is at least one second frequency point adopted in the routine frequency searching process performed in advance by the data processing device.

In order to describe the rapid frequency searching method for the data processing device according to the embodiments of the present disclosure, the routine frequency searching process related to the embodiments of the present disclosure will be introduced.

As shown in FIG. 2, in the embodiments of the present disclosure, the routine frequency searching process includes the following steps performed after the data processing device is started:

gradually raising the frequency of the computing chip in the data processing device from the initial frequency point to the target frequency at the initial output voltage of the power source of the data processing device, and recording at least one first frequency point gone through in the process that the frequency is gradually raised, in which when the computing chip is located at each of the at least one first frequency point, the computing chip enters a next first frequency point after a temperature of the data processing device is stabilized, until the data processing device reaches a stable working temperature when the computing chip in the data processing device achieves the target frequency; and after the computing chip in the data processing device achieves the target frequency, adjusting the output voltage of the power source of the data processing device and the frequency of the computing chip under a condition of keeping the stable working temperature of the data processing device substantially constant, in combination with test tasks delivered to the computing chip and feedback results from the computing chip, to obtain a limit frequency of the computing chip and an output voltage, corresponding to the limit frequency, of the power source of the data processing device at the stable working temperature, in which each of the at least one output voltage value and each of the at least one second frequency point adopted during adjustment are recorded in the process of adjusting the output voltage of the power source of the data processing device and the frequency of the computing chip. The temperature of the data processing device being stabilized for example refers to that the change of the temperature of the data processing device is smaller than a preset threshold within a certain period of time. Keeping the stable working temperature substantially constant for example refers to keeping the change of the stable working temperature within a preset range.

In the routine frequency searching process, the temperature rise rate of the data processing device needs to be taken into consideration. If an ambient temperature is extremely low, it would be difficult for the computing chip to immediately achieve a predefined target frequency when the data processing device is started, and therefore, the computing chip is required to gradually raise the frequency in combination with a temperature rise process during the operation of the data processing device to achieve the predefined target frequency.

As mentioned above, in the routine frequency searching process, the frequency of the computing chip in the data processing device is divided into several first frequency points between the initial frequency point and the target frequency. In an embodiment, the initial frequency point may be configured as the lowest frequency at which the computing chip is capable of operating at the beginning of starting the data processing device. A relationship among the initial frequency point, the first frequency points and the target frequency may refer to table 1.

TABLE 1

| Initial Frequency Point, First Frequency Points and Target Frequency Arranged from Low to High | | | | | |
|---|---|---|---|---|---|
| Initial frequency point | First frequency point a1 | First frequency point a2 | . . . | First frequency point an | Target frequency |

As shown in Table 1, the frequency at the initial frequency point is lower than the target frequency, and several first frequency points, i.e., the first frequency point a1, the first frequency point a2, . . . , and the first frequency point an are arranged in an order from low to high between the initial frequency point and the target frequency point.

At a frequency raising stage in the routine frequency searching process, that is, in a process that the frequency of the computing chip is raised from the initial frequency point to the target frequency after sequentially going through n first frequency points, the computing chip stays at each frequency point for enough time to wait for the temperature rise and stabilization of the data processing device at the frequency point. That is, when being located at the initial frequency point, the computing chip stays for a certain time to wait for the temperature of the data processing device to rise until the temperature is constant as the computing chip operates at the initial frequency point, and then the frequency of the computing chip is raised to the first frequency point a1; when being located at the first frequency point a1, the computing chip stays for a certain time to wait for the temperature of the data processing device to rise until the temperature is constant as the computing chip operates at the first frequency point a1, and then the frequency of the computing chip is raised to the first frequency point a2; and the procedure continues in a similar manner as described in the foregoing until the frequency of the computing chip is raised to the target frequency, and the temperature of the data processing device is raised to a working temperature and is stabilized at the working temperature.

At any one of the first frequency points at the frequency raising stage, the temperature change of the data processing device may be unapparent, and it is difficult to ensure that the temperature of the data processing device is stabilized at any one of the first frequency points. Therefore, in an embodiment, at the frequency raising stage in the routine frequency searching process, the staying time at each of the first frequency points is set as T1 so as to ensure that the temperature of the data processing device may be raised to a stable state within the time T1. Therefore, at the frequency raising stage in the routine frequency searching process, it can be ensured that the temperature of the data processing device rises as the frequency of the computing chip is raised, and the temperature of the data processing device can rise and be stabilized at the working temperature when the frequency of the computing chip is raised to the target frequency.

The control in the frequency raising stage in the routine frequency searching process as described above can guarantee the normal starting of the data processing device in an extreme environment such as a low-temperature environment. However, for a data processing device located in a common environment such as a room temperature condition, its temperature rises very rapidly after the data processing device is started, and a stable temperature has been reached before the staying time T1 is reached at each of the first frequency points. Therefore, for the data processing device in the common environment, the execution of the frequency searching process may be delayed due to the overlong time T1 at each of the first frequency points in the frequency raising stage in the routine frequency searching process.

Therefore, as mentioned in the above description, in the rapid frequency searching method for the data processing device in the embodiment of the present disclosure, at the frequency raising stage, the duration when the computing chip is located at each of the first frequency points is shorter than the duration when the computing chip is located at each of the first frequency points in the routine frequency searching process. For example, in the rapid frequency searching method for a data processing device according to the embodiment of the present disclosure, the staying time at each of the first frequency points is set as t1, where t1<T1. After such setting, it is possible that the frequency has been raised to a next first frequency point before the temperature of the data processing device at a certain first frequency point or some first frequency points rises to the stable state. However, since the temperature rises relatively quickly, the raising of the frequency of the computing chip would not be seriously affected. Furthermore, as a whole, in the rapid frequency searching method for the data processing device, by shortening the duration when the computing chip is located at each of the first frequency points, the frequency searching time can be remarkably shortened, and the raising of the frequency of the computing chip would not be affected seriously. For a data processing device which has been in a normal temperature state, has been subjected to the routine frequency searching process at an earlier stage and has recorded each of the first frequency points in the routine frequency searching process, when it is started again, it is unnecessary to execute the routine frequency searching process again, an effect which is basically the same as that of the frequency raising procedure in the routine frequency searching process can be achieved by only going through each of the first frequency points in the routine frequency searching process and correspondingly shortening the staying time, and the time in the frequency raising procedure can be greatly saved.

When the computing chip in the data processing device achieves the target frequency and the data processing device reaches the working temperature, a frequency and voltage optimization stage is entered.

As mentioned above, at the frequency and voltage optimization stage in the routine frequency searching process, the output voltage of the power source of the data processing device and the frequency of the computing chip are adjusted under a condition of keeping the stable working temperature of the data processing device substantially constant, in combination with test tasks delivered to the computing chip and feedback results from the computing chip, to obtain a limit frequency of the computing chip and an output voltage, corresponding to the limit frequency, of the power source of the data processing device at the stable working temperature, in which each of the at least one output voltage value and each of the at least one second frequency point adopted during adjustment are recorded in the process of adjusting the output voltage of the power source of the data processing device and the frequency of the computing chip.

The process includes the following steps:

keeping the stable working temperature of the data processing device substantially constant;

delivering a plurality of test tasks to the computing chip at any one output voltage value and any one second frequency point;

receiving feedback results from the computing chip, and determining whether the computing chip is capable of normally working at the one second frequency point under the condition of the stable working temperature according to a plurality of feedback results corresponding to the plurality of test tasks; and traversing all output voltage values and all second frequency points under each of the at least one output voltage value to determine a highest second frequency point, at which the computing chip is capable of normally working under the stable working temperature, and an output voltage value corresponding to the highest second frequency point, determining the highest second frequency point as the limit frequency of the computing chip under the condition of the stable working temperature, and determining the output voltage value corresponding to the highest second frequency point as the output voltage, corresponding to the limit frequency, of the power source of the data processing device under the condition of the stable working temperature.

Specifically, assuming that the number of the output voltage values is for example m, and the number of the second frequency points is for example r, then, all the output voltage values and all the second frequency points under each of the output voltage values are traversed, and thus, combinations as shown in table 2 can be obtained at most.

TABLE 2

| Combinations of Output Voltage Values and Second Frequency Points | |
|---|---|
| Output voltage value b1 | Second frequency point c1 |
| Output voltage value b1 | Second frequency point c2 |
| ... | ... |
| Output voltage value b1 | Second frequency point cr |
| Output voltage value b2 | Second frequency point c1 |
| Output voltage value b2 | Second frequency point c2 |
| ... | ... |
| Output voltage value b2 | Second frequency point cr |
| ... | ... |
| Output voltage value bm | Second frequency point c1 |
| Output voltage value bm | Second frequency point c2 |
| ... | ... |
| Output voltage value bm | Second frequency point cr |

For each of the combinations of the output voltage values and the second frequency points in Table 2, the plurality of test tasks are delivered to the computing chip, and the feedback results from the computing chip are received.

For example, when the power source of the data processing device is of the output voltage value b1 and the computing chip is of the second frequency point c1, a plurality of test tasks are delivered to the computing chip, and feedback results from the computing chip are received. Correct results of the computing chip performing the test tasks are known. When the plurality of test tasks are delivered to the computing chip and performed by the computing chip, due to the fact that the work of the computing chip may be affected by factors such as interference, error results are achieved after the test tasks are performed, the plurality of test tasks are delivered to the computing chip so as to be performed by the computing chip, and in this way, there may be correct results or error results in the feedback results from the computing chip, and whether a feedback result from the computing chip is correct may be determined by comparing the feedback result from the computing chip with a known correct result. For example, in the feedback results obtained after the computing chip performs the plurality of test tasks, when the number of correct results reaches a predefined number, the output voltage value b1 and the second frequency point c1 at which the computing chip is located may be regarded as a combination, which guarantees the normal work of the data processing device when the stable working temperature of the data processing device is constant, of the working frequency of the computing chip and the output voltage of the power source of the data processing device; or else, if the number of correct results does not reach the predefined number, the output voltage value b1 and the second frequency point c1 at which the computing chip is located may be regarded as a combination that cannot guarantee the normal work of the data processing device, and thus, the combination of the output voltage value b1 and the second frequency point c1 at which the computing chip is located can be abandoned.

In such a manner, the feedback results, corresponding to all the combinations in Table 2, of the computing chip are obtained, and all the combinations, which can guarantee the normal work of the data processing device when the stable working temperature of the data processing device is constant, of the working frequency of the computing chip and the output voltage of the power source of the data processing device are determined. In these combinations which can guarantee the normal work of the data processing device, a second frequency point and an output voltage value where the second frequency point is the highest are respectively used as the working frequency of the computing chip and the output voltage of the power source of the data processing device when the stable working temperature of the data processing device is constant.

Since there are many computing chips in the data processing device, it is also necessary to deliver a plurality of test tasks to each of the computing chips and comprehensively evaluate the working frequencies of all the computing chips and the output voltages, respectively corresponding to the working frequencies, of the power source of the data processing device to determine an optimal output voltage of the power source and a corresponding working frequency for each of the computing chips. Therefore, at the frequency and voltage optimization stage in the routine frequency searching process, a great deal of time may be cost to perform the plurality of test tasks. For a data processing device which is located in the same environment for a long time, although there may be slight differences in the microenvironment (e.g., weak fluctuations in the ambient temperature or the power grid voltage) every time it is started, if such frequency and voltage optimization is performed during starting every time, it may take a great deal of time, but there may not be excessively large differences in the finally obtained working frequencies of the computing chips and the output voltage of the power source of the data processing device, which certainly causes the issue of low frequency and voltage optimization efficiency.

Therefore, in an embodiment, in the rapid frequency searching method for the data processing device according to the embodiments of the present disclosure, the number of the test tasks delivered to the computing chip at the frequency and voltage optimization stage is smaller than that of the test tasks delivered to the computing chip in the routine frequency searching process.

For a data processing device which has been subjected to the routine frequency searching process at an earlier stage and has recorded each of the output voltage values and each of the second frequency points in the routine frequency searching process, when it is started again, it is unnecessary to execute the routine frequency searching process again, an effect which is the same as or similar to that of the frequency and voltage optimization stage in the routine frequency searching process can be achieved by reducing the number of the test tasks delivered to each of the combinations of the output voltage values and the second frequency points at the frequency and voltage optimization stage, and the time in the frequency and voltage optimization stage can be greatly saved.

According to the embodiments of the present disclosure, at the frequency and voltage optimization stage in the rapid frequency searching method for the data processing device, the output voltage of the power source of the data processing device and the frequency of the computing chip are adjusted according to at least one output voltage value and at least one second frequency point, which are recorded in advance, in combination with test tasks delivered to the computing chip and feedback results from the computing chip to obtain a limit frequency of the computing chip and an output voltage, corresponding to the limit frequency, of the power source of the data processing device. Recording in advance refers to recording in the routine frequency searching process before the rapid frequency searching method for the data processing device is performed.

The process includes the following steps:

delivering a plurality of test tasks to the computing chip at any one output voltage value and any one second frequency point;

receiving feedback results from the computing chip, and determining whether the computing chip is capable of normally working at the one second frequency point according to a plurality of feedback results corresponding to the plurality of test tasks; and traversing all output voltage values and all second frequency points under each of the at least one output voltage value to determine a highest second frequency point at which the computing chip is capable of normally working and an output voltage value corresponding to the highest second frequency point, determining the highest second frequency point as the limit frequency of the computing chip, and determining the output voltage value corresponding to the highest second frequency point as the output voltage, corresponding to the limit frequency, of the power source of the data processing device.

In the rapid frequency searching method for the data processing device according to the embodiments of the present disclosure, the waiting time at each frequency point at a frequency raising stage is shortened according to related parameters (e.g., the first frequency points) recorded during routine frequency search, and the number of the test tasks at the frequency and voltage optimization stage is reduced, so that the frequency searching process is accelerated as a whole, and the frequency searching time is greatly saved.

An extreme operation environment, such as a low-temperature environment, may be taken into consideration during routine frequency search. In the low-temperature environment, the data processing device needs to take sufficient time to raise the temperature of its computing power board, and therefore, and therefore it is necessary to make ensure that the temperature in each part reaches a desired temperature. In the rapid frequency searching method for the data processing device according to the embodiments of the present disclosure, excessive waiting operations on the temperature are not performed any more, and the accuracy of a frequency searching result would not be affected in most of non-extreme environments.

In order to make the operation power consumption of the data processing device as low as possible, output voltage points of the power source may be repeatedly determined by delivering a great number of test tasks during routine frequency search. In the rapid frequency searching method for the data processing device according to the embodiments of the present disclosure, the relevant parameters (such as the output voltage values and the second frequency points) recorded during routine frequency search performed in advance are adopted, and processes for repeated confirmation are reduced by reducing the test tasks, so that the purpose of rapidly adjusting the output voltage of the power source is achieved.

In a process that the data processing device is started, in order to achieve the optimal performance, there may be relatively complicated frequency searching processes. In most scenarios of actual applications, it is unnecessary to take influences of some extreme factors on the frequency searching results into consideration. Then, parts of the frequency searching processes may be simplified, so that the purpose of shortening the frequency searching time is achieved. By using the rapid frequency searching method for the data processing device according to the embodiments of the present disclosure, the frequency searching time after the data processing device is started can be greatly shortened in non-extreme environments. A routine frequency searching mode needs to take about 30 minutes, the rapid frequency searching method for the data processing device according to the embodiments of the present disclosure only takes 5-10 minutes to complete the frequency searching processes, and therefore, at least 20 minutes are saved, which on the one hand, reduces the power consumption caused during frequency search, and on the other hand, further improves the data processing efficiency when the saved time is used for data processing and calculating of the data processing device.

Compared with the routine frequency searching mode, the rapid frequency searching method for the data processing device according to the embodiments of the present disclosure may not be that good in terms of adaptability to some extreme environments and the stability may be lowered. However, most often, the data processing device is located in a non-extreme environment, and therefore, in the non-extreme environment, the rapid frequency searching method for the data processing device according to the embodiments of the present disclosure is more suitable for scenarios where frequent and repeated starting is required, while ensuring that functions and performances are basically maintained.

In addition, when the rapid frequency searching method for the data processing device of a mining machine according to the embodiments of the present disclosure is combined with the routine frequency searching process, it enables the data processing device of the mining machine to achieve a stable and reliable effect by virtue of the routine frequency searching process when an extreme environment change occurs, and achieves a purpose of rapid starting in a non-extreme environment. The rapid frequency searching method for the data processing device of the mining machine according to the embodiments of the present disclosure and the routine frequency searching process supplement each other, so that frequency searching requirements of the data processing device of the mining machine under various environmental conditions are met.

An embodiment of the present disclosure further provides a rapid frequency searching apparatus for a data processing device. As shown in FIG. 3, the rapid frequency searching apparatus includes a storage module 1 and an execution module 2, in which the storage module is configured to store at least one first frequency point recorded in advance, at least one output voltage value recorded in advance, and at least one second frequency point recorded in advance; and the execution module 2 is configured to: gradually raise a frequency of a computing chip in the data processing device from an initial frequency point to a target frequency through the at least one first frequency point stored in the storage module 1, at an initial output voltage of a power source of the data processing device, in which a duration when the computing chip is located at each of the at least one first frequency point is shorter than a duration when the computing chip is located at each of the at least one first frequency point in a routine frequency searching process; and after the computing chip in the data processing device achieves the target frequency, adjust an output voltage of the power source of the data processing device and the frequency of the computing chip according to the at least one output voltage value and the at least one second frequency point stored in the storage module 1, in combination with test tasks delivered to the computing chip and feedback results from the computing chip, to obtain a limit frequency of the computing chip and an output voltage, corresponding to the limit frequency, of the power source of the data processing device.

For further process of the execution module 2 please refer to the embodiments of the above rapid frequency searching method for the data processing device.

An embodiment of the present disclosure further provides a data processing device, in which the data processing device is configured to process data of virtual currencies, and the data processing device adopts the above rapid frequency searching apparatus for the data processing device.

An embodiment of the present disclosure further provides a non-transitory computer readable storage medium, in which the non-transitory computer readable storage medium stores instructions which, when being executed by a processor, enables the processor to perform all the steps in the rapid frequency searching method for the data processing device in the above description.

Figure 4:
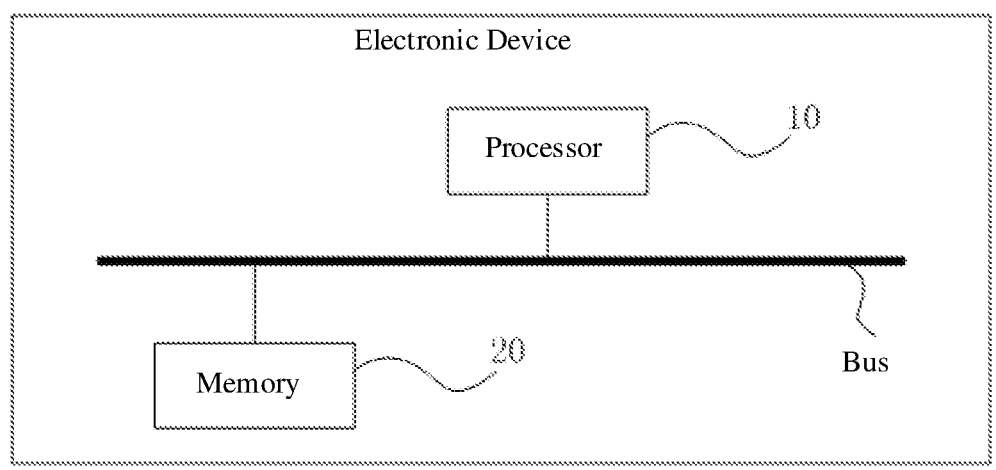
FIG. 4 is a schematic diagram showing a structure of an electronic device in an embodiment of the present disclosure.

An embodiment of the present disclosure further provides an electronic device for executing the rapid frequency searching method for the data processing device. As shown in FIG. 4, the electronic device includes: at least one processor 10 and a memory 20. The memory 20 is communicate with the at least one processor 10, for example, the memory 20 is connected with the at least one processor 10 by a bus. The memory 20 stores instructions executable for the at least one processor 10, and the instruction is executed by the at least one processor 10 to enable the at least one processor 10 to perform all the steps in the rapid frequency searching method for the data processing device in the above description.

The above descriptions are merely preferred embodiments of the present disclosure and are not intended to limit the present disclosure. Any modifications, equivalent replacements, improvements and the like made within the spirit and principle of the present disclosure shall fall within the protection scope of the present disclosure.

The invention claimed is:

1. A rapid frequency searching method for a mining machine, comprising the following steps performed after the mining machine is started:
   gradually raising a frequency of a computing chip in the mining machine from an initial frequency point to a target frequency through at least one first frequency point recorded in advance, at an initial output voltage of a power source of the mining machine, wherein a duration when the computing chip is located at each of the at least one first frequency point is shorter than a duration when the computing chip is located at each of the at least one first frequency point in a routine frequency searching process, and a temperature of an environment where the mining machine is started is higher than a temperature of an extremely-low-temperature environment to which the routine frequency searching process is applicable; and
   after the computing chip in the mining machine achieves the target frequency, adjusting an output voltage of the power source of the mining machine and the frequency of the computing chip, according to at least one output voltage value and at least one second frequency point recorded in advance, in combination with test tasks delivered to the computing chip and feedback results from the computing chip, to obtain a limit frequency of the computing chip and an output voltage, corresponding to the limit frequency, of the power source of the mining machine.

2. The rapid frequency searching method for a mining machine of claim 1, wherein
the at least one first frequency point recorded in advance is at least one first frequency point gone through in the routine frequency searching process performed in advance by the mining machine;
the at least one output voltage value recorded in advance is at least one output voltage value adopted in the routine frequency searching process performed in advance by the mining machine; and
the at least one second frequency point recorded in advance is at least one second frequency point adopted in the routine frequency searching process performed in advance by the mining machine.

3. The rapid frequency searching method for a mining machine of claim 1, wherein the routine frequency searching process comprises the following steps performed after the mining machine is started:
gradually raising the frequency of the computing chip in the mining machine from the initial frequency point to the target frequency at the initial output voltage of the power source of the mining machine, and recording at least one first frequency point gone through in the process that the frequency is gradually raised, wherein when the computing chip is located at each of the at least one first frequency point, the computing chip enters a next first frequency point after a temperature of the mining machine is stabilized, until the mining machine reaches a stable working temperature when the computing chip in the mining machine achieves the target frequency; and
after the computing chip in the mining machine achieves the target frequency, adjusting the output voltage of the power source of the mining machine and the frequency of the computing chip under a condition of keeping the stable working temperature of the mining machine substantially constant, in combination with test tasks delivered to the computing chip and feedback results from the computing chip, to obtain a limit frequency of the computing chip and an output voltage, corresponding to the limit frequency, of the power source of the mining machine at the stable working temperature, wherein each of the at least one output voltage value and each of the at least one second frequency point adopted during adjustment are recorded in the process of adjusting the output voltage of the power source of the mining machine and the frequency of the computing chip.

4. The rapid frequency searching method for a mining machine of claim 3, wherein
in the rapid frequency searching method for the mining machine, the number of the test tasks delivered to the computing chip is smaller than the number of the test tasks delivered to the computing chip in the routine frequency searching process.

5. The rapid frequency searching method for a mining machine of claim 3, wherein the step of adjusting the output voltage of the power source of the mining machine and the frequency of the computing chip under the condition of keeping the stable working temperature of the mining machine substantially constant, in combination with the test tasks delivered to the computing chip and the feedback results from the computing chip, to obtain the limit frequency of the computing chip and the output voltage, corresponding to the limit frequency, of the power source of the mining machine at the stable working temperature comprises:
keeping the stable working temperature of the mining machine substantially constant;
delivering a plurality of test tasks to the computing chip at any one output voltage value and any one second frequency point;
receiving feedback results from the computing chip, and determining whether the computing chip is capable of normally working at the one second frequency point under the condition of the stable working temperature according to a plurality of feedback results corresponding to the plurality of test tasks; and
traversing all output voltage values and all second frequency points under each of the at least one output voltage value to determine a highest second frequency point, at which the computing chip is capable of normally working under the stable working temperature, and an output voltage value corresponding to the highest second frequency point, determining the highest second frequency point as the limit frequency of the computing chip under the condition of the stable working temperature, and determining the output voltage value corresponding to the highest second frequency point as the output voltage, corresponding to the limit frequency, of the power source of the mining machine under the condition of the stable working temperature.

6. The rapid frequency searching method for a mining machine of claim 1, wherein the step of adjusting the output voltage of the power source of the mining machine and the frequency of the computing chip, according to the at least one output voltage value and the at least one second frequency point recorded in advance, in combination with the test tasks delivered to the computing chip and the feedback results from the computing chip, to obtain the limit frequency of the computing chip and the output voltage, corresponding to the limit frequency, of the power source of the mining machine comprises:
delivering a plurality of test tasks to the computing chip at any one output voltage value and any one second frequency point;
receiving feedback results from the computing chip, and determining whether the computing chip is capable of normally working at the one second frequency point according to a plurality of feedback results corresponding to the plurality of test tasks; and
traversing all output voltage values and all second frequency points under each of the at least one output voltage value to determine a highest second frequency point at which the computing chip is capable of normally working and an output voltage value corresponding to the highest second frequency point, determining the highest second frequency point as the limit frequency of the computing chip, and determining the output voltage value corresponding to the highest second frequency point as the output voltage, corresponding to the limit frequency, of the power source of the mining machine.

7. A non-transitory computer readable storage medium, wherein the non-transitory computer readable storage medium stores instructions which, when being executed by a processor, enable the processor to perform the following steps after a mining machine is started:

gradually raising a frequency of a computing chip in the mining machine from an initial frequency point to a target frequency through at least one first frequency point recorded in advance, at an initial output voltage of a power source of the mining machine, wherein a duration when the computing chip is located at each of the at least one first frequency point is shorter than a duration when the computing chip is located at each of the at least one first frequency point in a routine frequency searching process, and a temperature of an environment where the mining machine is started is higher than a temperature of an extremely-low-temperature environment to which the routine frequency searching process is applicable; and after the computing chip in the mining machine achieves the target frequency, adjusting an output voltage of the power source of the mining machine and the frequency of the computing chip, according to at least one output voltage value and at least one second frequency point recorded in advance, in combination with test tasks delivered to the computing chip and feedback results from the computing chip, to obtain a limit frequency of the computing chip and an output voltage, corresponding to the limit frequency, of the power source of the mining machine.

8. The non-transitory computer readable storage medium of claim 7, wherein the at least one first frequency point recorded in advance is at least one first frequency point gone through in the routine frequency searching process performed in advance by the mining machine;

the at least one output voltage value recorded in advance is at least one output voltage value adopted in the routine frequency searching process performed in advance by the mining machine; and the at least one second frequency point recorded in advance is at least one second frequency point adopted in the routine frequency searching process performed in advance by the mining machine.

9. The non-transitory computer readable storage medium of claim 7, wherein the routine frequency searching process comprises the following steps performed after the mining machine is started:

gradually raising the frequency of the computing chip in the mining machine from the initial frequency point to the target frequency at the initial output voltage of the power source of the mining machine, and recording at least one first frequency point gone through in the process that the frequency is gradually raised, wherein when the computing chip is located at each of the at least one first frequency point, the computing chip enters a next first frequency point after a temperature of the mining machine is stabilized, until the mining machine reaches a stable working temperature when the computing chip in the mining machine achieves the target frequency; and after the computing chip in the mining machine achieves the target frequency, adjusting the output voltage of the power source of the mining machine and the frequency of the computing chip under a condition of keeping the stable working temperature of the mining machine substantially constant, in combination with test tasks delivered to the computing chip and feedback results from the computing chip, to obtain a limit frequency of the computing chip and an output voltage, corresponding to the limit frequency, of the power source of the mining machine at the stable working temperature, wherein each of the at least one output voltage value and each of the at least one second frequency point adopted during adjustment are recorded in the process of adjusting the output voltage of the power source of the mining machine and the frequency of the computing chip.

10. The non-transitory computer readable storage medium of claim 9, wherein in the rapid frequency searching method for the mining machine, the number of the test tasks delivered to the computing chip is smaller than the number of the test tasks delivered to the computing chip in the routine frequency searching process.

11. The non-transitory computer readable storage medium of claim 9, wherein the step of adjusting the output voltage of the power source of the mining machine and the frequency of the computing chip under the condition of keeping the stable working temperature of the mining machine substantially constant, in combination with the test tasks delivered to the computing chip and the feedback results from the computing chip, to obtain the limit frequency of the computing chip and the output voltage, corresponding to the limit frequency, of the power source of the mining machine at the stable working temperature comprises:

keeping the stable working temperature of the mining machine substantially constant;

delivering a plurality of test tasks to the computing chip at any one output voltage value and any one second frequency point;

receiving feedback results from the computing chip, and determining whether the computing chip is capable of normally working at the one second frequency point under the condition of the stable working temperature according to a plurality of feedback results corresponding to the plurality of test tasks; and traversing all output voltage values and all second frequency points under each of the at least one output voltage value to determine a highest second frequency point at which the computing chip is capable of normally working and an output voltage value corresponding to the highest second frequency point, determining the highest second frequency point as the limit frequency of the computing chip under the condition of the stable working temperature, and determining the output voltage value corresponding to the highest second frequency point as the output voltage, corresponding to the limit frequency, of the power source of the mining machine under the condition of the stable working temperature.

12. The non-transitory computer readable storage medium of claim 7, wherein the step of adjusting the output voltage of the power source of the mining machine and the frequency of the computing chip, according to the at least one output voltage value and the at least one second frequency point recorded in advance, in combination with the test tasks delivered to the computing chip and the feedback results from the computing chip, to obtain the limit frequency of the computing chip and the output voltage, corresponding to the limit frequency, of the power source of the mining machine comprises:

delivering a plurality of test tasks to the computing chip at any one output voltage value and any one second frequency point;

receiving feedback results from the computing chip, and determining whether the computing chip is capable of normally working at the one second frequency point according to a plurality of feedback results corresponding to the plurality of test tasks; and traversing all output voltage values and all second frequency points under each of the at least one output voltage value to determine a highest second frequency point at which the computing chip is capable of normally working and an output voltage value corresponding to the highest second frequency point, determining the highest second frequency point as the limit frequency of the computing chip, and determining the output voltage value corresponding to the highest second frequency point as the output voltage, corresponding to the limit frequency, of the power source of the mining machine.

13. An electronic device, comprising:

at least one processor; and a memory in communication connection with the at least one processor; wherein the memory stores instructions executable for the at least one processor, and the instructions are executed by the at least one processor to enable the at least one processor to perform the following steps after a mining machine is started:

gradually raising a frequency of a computing chip in the mining machine from an initial frequency point to a target frequency through at least one first frequency point recorded in advance, at an initial output voltage of a power source of the mining machine, wherein a duration when the computing chip is located at each of the at least one first frequency point is shorter than a duration when the computing chip is located at each of the at least one first frequency point in a routine frequency searching process, and a temperature of an environment where the mining machine is started is higher than a temperature of an extremely-low-temperature environment to which the routine frequency searching process is applicable; and after the computing chip in the mining machine achieves the target frequency, adjusting an output voltage of the power source of the mining machine and the frequency of the computing chip, according to at least one output voltage value and at least one second frequency point recorded in advance, in combination with test tasks delivered to the computing chip and feedback results from the computing chip, to obtain a limit frequency of the computing chip and an output voltage, corresponding to the limit frequency, of the power source of the mining machine.

14. The electronic device of claim 13, wherein the at least one first frequency point recorded in advance is at least one first frequency point gone through in the routine frequency searching process performed in advance by the mining machine;

the at least one output voltage value recorded in advance is at least one output voltage value adopted in the routine frequency searching process performed in advance by the mining machine; and the at least one second frequency point recorded in advance is at least one second frequency point adopted in the routine frequency searching process performed in advance by the mining machine.

15. The electronic device of claim 13, wherein the routine frequency searching process comprises the following steps performed after the mining machine is started:

gradually raising the frequency of the computing chip in the mining machine from the initial frequency point to the target frequency at the initial output voltage of the power source of the mining machine, and recording at least one first frequency point gone through in the process that the frequency is gradually raised, wherein when the computing chip is located at each of the at least one first frequency point, the computing chip enters a next first frequency point after a temperature of the mining machine is stabilized, until the mining machine reaches a stable working temperature when the computing chip in the mining machine achieves the target frequency; and after the computing chip in the mining machine achieves the target frequency, adjusting the output voltage of the power source of the mining machine and the frequency of the computing chip under a condition of keeping the stable working temperature of the mining machine substantially constant, in combination with test tasks delivered to the computing chip and feedback results from the computing chip, to obtain a limit frequency of the computing chip and an output voltage, corresponding to the limit frequency, of the power source of the mining machine at the stable working temperature, wherein each of the at least one output voltage value and each of the at least one second frequency point adopted during adjustment are recorded in the process of adjusting the output voltage of the power source of the mining machine and the frequency of the computing chip.

16. The electronic device of claim 15, wherein in the rapid frequency searching method for the mining machine, the number of the test tasks delivered to the computing chip is smaller than the number of the test tasks delivered to the computing chip in the routine frequency searching process.

17. The electronic device of claim 15, wherein the step of adjusting the output voltage of the power source of the mining machine and the frequency of the computing chip under the condition of keeping the stable working temperature of the mining machine substantially constant, in combination with the test tasks delivered to the computing chip and the feedback results from the computing chip, to obtain the limit frequency of the computing chip and the output voltage, corresponding to the limit frequency, of the power source of the mining machine at the stable working temperature comprises:

keeping the stable working temperature of the mining machine substantially constant;

delivering a plurality of test tasks to the computing chip at any one output voltage value and any one second frequency point;

receiving feedback results from the computing chip, and determining whether the computing chip is capable of normally working at the one second frequency point under the condition of the stable working temperature according to a plurality of feedback results corresponding to the plurality of test tasks; and traversing all output voltage values and all second frequency points under each of the at least one output voltage value to determine a highest second frequency point at which the computing chip is capable of normally working and an output voltage value corresponding to the highest second frequency point, determining the highest second frequency point as the limit frequency of the computing chip under the condition of the stable working temperature, and determining the output voltage value corresponding to the highest second frequency point as the output voltage, corresponding to the limit frequency, of the power source of the mining machine under the condition of the stable working temperature.

18. The electronic device of claim 13, wherein the step of adjusting the output voltage of the power source of the mining machine and the frequency of the computing chip, according to the at least one output voltage value and the at least one second frequency point recorded in advance, in combination with the test tasks delivered to the computing chip and the feedback results from the computing chip, to obtain the limit frequency of the computing chip and the output voltage, corresponding to the limit frequency, of the power source of the mining machine comprises:

delivering a plurality of test tasks to the computing chip at any one output voltage value and any one second frequency point;

receiving feedback results from the computing chip, and determining whether the computing chip is capable of normally working at the one second frequency point according to a plurality of feedback results corresponding to the plurality of test tasks; and traversing all output voltage values and all second frequency points under each of the at least one output voltage value to determine a highest second frequency point at which the computing chip is capable of normally working and an output voltage value corresponding to the highest second frequency point, determining the highest second frequency point as the limit frequency of the computing chip, and determining the output voltage value corresponding to the highest second frequency point as the output voltage, corresponding to the limit frequency, of the power source of the mining machine.

\* \* \* \* \*